United States Patent Office 3,060,127
Patented Oct. 23, 1962

3,060,127
METHOD OF SOLUBILIZING IRON
Sheldon A. Buckler, Stamford, and Vernon P. Wystrach, Darien, Conn., assignors to American Cyanamid Company, New York, N.Y., a corporation of Maine
No Drawing. Original application June 27, 1957, Ser. No. 668,332, now Patent No. 2,953,584, dated Sept. 20, 1960. Divided and this application July 5, 1960, Ser. No. 44,490
1 Claim. (Cl. 252—175)

The present invention relates to new and novel compounds and to a method for their preparation. More particularly, it relates to phosphinic acid derivatives derived from α-ketoalkanoic acids and hypophosphorous acid. Still more specifically, the invention is concerned with bis(1-alkyl-1-carboxy-1-hydroxymethyl)phosphinic acids and neutral alkali metal and alkaline earth metal salts thereof which may be represented by the general formula:

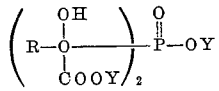

wherein Y is hydrogen, an alkali metal including lithium, sodium and potassium or an alkaline earth metal, such as calcium, barium and strontium, and R is an alkyl radical containing from 1 to 17 carbon atoms.

The compounds of the present invention are particularly useful as sequestering agents in the selective removal of heavy metal values from mixtures containing ions, such as nickel, cobalt, copper, iron, uranyl and thorium (IV) in the presence of alkali and alkaline earth ions. Thus, for example, ferric ion may be sequestered selectively from an alkaline solution containing both iron and calcium ions. In an application of this phenomenon, iron chlorosis in soil can be prevented or alleviated by treating an alkaline soil with the phosphinic acid derivative above-defined, such that a solubilized iron complex is formed in preference to the formation of the calcium complex. In addition, uranyl values can be selectively leached from an ore containing the same by employing techniques known in the art, as shown by Blake et al. in the Atomic Energy Commission Report ORNL–1903, May 13, 1955. Moreover, in the sizing of paper, ferric ions may be removed as a complex from the slum, which ion would otherwise cause discoloration in the finished product.

The bis(1-alkyl-1-carboxy-1-hydroxymethyl)phosphinic acids of the present invention may be prepared in a straightforward manner. This involves bringing into reactive combination an α-ketoalkanoic acid containing from 3 to 19 carbon atoms, and isomers thereof, with hypophosphorous acid until reaction is complete. The reaction takes place over a wide range of temperatures, usually from 20° C. to 100° C. A solid product is obtained. It is recrystallized from a suitable solvent, such as acetic acid.

Typically illustrative of the α-ketoalkanoic acid employed in the process of the invention are: pyruvic acid (α-ketopropionic acid), α-ketobutyric acid, α-ketopentanoic acid, α-ketooctanoic acid, α-ketododecanoic acid, α-ketotetradecanoic acid, α-ketononadecanoic acid, and equivalents thereof. In general, the products prepared by the present invention are formed, as indicated above, by reacting approximately two moles of an α-ketoalkanoic acid with one mole of a hypophosphorous acid. However, the mole ratio of reactants may be varied without appreciably affecting the yield of product. Thus, for example, approximately up to about 2.5 moles of the α-keto acid may be reacted with about one mole of the hypophosphorous acid.

Hypophosphorous acid may be employed in the process of the invention either in an aqueous or in a non-aqueous environment. Inert organic solvents may be used, as for example ether, acetone, tetrahydrofuran and dioxane. Alternatively, an alkali metal salt of hypophosphite, such as sodium hypophosphite in the presence of a mineral acid, such as hydrochloric acid, can be substituted for hypophosphorous acid.

Reaction can be completed within about 30 minutes and about 4 hours depending upon the temperatrue selected. Phosphinic acid derivatives may be permitted to stand at room temperature for about 5 to 7 days to obtain a precipitate which can be filtered. However, the desired phosphinic acid derivative may be recoverd swiftly by evaporation and, if desired, resultant acid derivative can be recrystallized from acetic acid. Moreover, when the reaction is complete, sufficient alkali may be added to the reaction mass to form the neutral salt of the acid. Resultant salt is obtained as a solid by evaporating the neutralized reaction mass. Typical alkaline neutralization agents include the alkali metal hydroxide, carbonates, bicarbonates and equivalents thereof, as for example, the hydroxides of sodium, potassium, lithium, and the carbonates or bicarbonates of the latter metals. Also contemplated as neutralization agents are the alkaline earth hydroxides, oxides and carbonates of such metals as calcium, barium and strontium.

The invention will be further illustrated in the following examples which are not to be construed as limitative. Unless otherwise stated, the parts given are by weight.

EXAMPLE 1

Preparation of Bis(1-Methyl-1-Carboxy-1-Hydroxymethyl)Phosphinic Acid 132 parts of 50% hypophosphorous acid in water is mixed with 176 parts of pyruvic acid in a suitable vessel at room temperature. In three and one-half hours, reaction is completed. The contents are evaporated over a steam bath under reduced pressure. Residue is filtered under vacuum and recrystallized from acetic acid. There is then obtained 121.6 parts of product, identified by infrared examination as bis(1-methyl-1-carboxy-1-hydroxymethyl)phosphinic acid. The latter compound has a melting point of 148° C. to 149° C. and is soluble in water and alcohol. It has a theoretical neutralization equivalent equal to 80.7 and the neutralization equivalent found equals 80.9.

EXAMPLE 2

The procedure of Example 1 is followed in every detail except that an equal mixture of sodium hypophosphite and hydrochloric acid in ether is substituted for the hypophosphorous acid of the preceding example.

EXAMPLE 3

Preparation of Bis(1-Ethyl-1-Carboxy-1-Hydroxymethyl)Phosphinic Acid

As in the preceding Example 1, approximately 2 moles of α-ketobutyric acid is reacted with a 50% aqueous solution of hypophosphorous acid in an amount sufficient to supply approximately 1.1 moles of the acid. The mixture is mixed at 80° C. for 75 minutes. The reaction mass is allowed to stand at room temperature for about six days. Thereafter, excess water is removed therefrom by distillation, and a solid is obtained in good yield. It is recrystallized from acetic acid and is found to be bis(1-ethyl-1-carboxy-1-hydroxymethyl)phosphinic acid as determined by infrared examination. Its melting point is 153° C.–154° C. and its found N.E. (i.e., neutralization equivalent) equals 90.8, whereas its theoretical N.E. equals 90.1.

Calculated for $C_8H_{15}O_8P$: C=35.56; H=5.60; P=11.47. Found: C=35.28; H=5.66; P=11.36.

EXAMPLE 4

Preparation of Bis(1-Heptadecyl-1-Carboxy-1-Hydroxymethyl)Phosphinic Acid

To a suitable vessel containing 6.2 parts of α-ketononadecanoic acid there is charged 1.35 parts of 50% hypophosphorous acid in 10 parts of dioxane. A temperature of about 40° C. for eight days is maintained. Thereafter, the solvent is removed and a waxy solid, which has a neutralization equivalent of 236, is obtained.

EXAMPLE 5

Preparation of Trisodium Bis(1-Methyl-1-Carboxy-1-Hydroxymethyl)phosphinate 132 parts of 50% hypophosphorous acid in water is thoroughly mixed with 176 parts of pyruvic acid in a suitable vessel. After the exothermic reaction subsides, the mixture is allowed to stand at a temperature of 30° C.–40° C. for an additional two hours, whereupon it is neutralized to pH 8–9 with a solution of 50% aqueous sodium hydroxide. The final solution contains about 60%–65% dissolved solids which comprise the trisodium salt. Solid trisodium salt is next recovered as a crystalline solid by evaporation of water from the aqueous solution. Trisodium bis(1 - methyl - 1 - carboxy-1-hydroxymethyl)-phosphinate is a hygroscopic, white crystalline solid which melts at 120° C.–128° C. and then resolidifies, whereafter it remains solid at temperatures up to 300° C.

The corresponding potassium, lithium and calcium salts are obtained in a similar manner.

EXAMPLE 6

This example illustrates the formation of a ferric ion complex of bis(1-methyl-1-carboxy - 1 - hydroxymethyl)-phosphinic acid in an alkaline solution.

In a suitable vessel, bis(1-methyl-1-carboxy-1-hydroxymethyl)phosphinic acid (0.25 part by weight) is dissolved in water to make 100 parts by weight of solution. The basicity of the solution is adjusted to pH 8 with sufficient 0.1 normal sodium hydroxide solution. Twenty parts by weight of a ferric ammonium solution containing 0.01 part of ferric ion per part of solution is added. The solution is a deep reddish-brown in color. Although the solution contains 3.47 moles of ferric ion per mole of complexing agent, i.e., bis(1-methyl-1-carboxy-1-hydroxymethyl)phosphinic acid, precipitation of ferric hydroxide is not observed after several weeks standing at ambient temperature (21° C.–23° C.). Consequently, the resulting ferric bis(1-methyl-1-carboxy-1-hydroxymethyl)phosphinate remains unprecipitated.

A 25 percent by weight aqueous solution of ferric bis-(1-methyl-1-carboxy - 1 - hydroxymethyl)phosphinate, in which the ratio of $Fe^{+3}$ to phosphinate is 3:1, is prepared in the manner above only at a pH of 10. The solution thus formed is evaporated to dryness, and the resulting chelate (after drying at 121° C. to constant weight) is a free-flowing powder suitable for distributing on soil for the alleviation of chlorosis. It dissolves readily in water to a clear 1 percent by weight solution having a pH of 10.

EXAMPLE 7

The first portion of the preceding example is repeated in every material aspect, excepting that the pH is adjusted to 11 instead of 8. The result is substantially the same in that no precipitation is observed after several weeks standing.

EXAMPLE 8

This example shows the effect of the novel products of the present invention on various heavy metal ions other than ferric ions. Amounts of each of the several ions tabulated below are admixed, respectively, with separate equimolar portions of a 0.01 molar solution of bis(1-methyl-1-carboxy-1-hydroxymethyl)phosphinic acid. The results are as follows:

TABLE I

| Ion | pH | Comment |
|---|---|---|
| 1. Cupric | 10.1–11.7 | No Precipitate. |
| 2. Nickel $^{+2}$ | 2.6–11.8 | Do. |
| 3. Palladium | 2.2–11.5 | Do. |
| 4. Thorium $^{+4}$ | 11.5–12.0 | Do. |
| 5. Uranyl $^{+2}$ | 10.7–11.8 | Do. |
| 6. Titanium $^{+3}$ | 5.5–12.0 | Do. |

After standing two weeks, for example, samples 1–4 exhibited no precipitate. From the above data, therefore, the versatility of the phosphinic acid derivatives of the instant invention as sequestering agents over a wide pH range can readily be seen.

EXAMPLE 9

It is an important advantage of the bis(1-alkyl-1-carboxy-1-hydroxymethyl)phosphinic acids of the present invention and their alkali metal salts that they sequester much more iron per mole than do other known sequestering agents. Thus, one mole of bis(1-methyl-1-carboxy-1-hydroxymethyl)phosphinic acid sequesters about 6 moles of ferric iron ($Fe^{+3}$) at a pH up to about 10 and about 4.5 moles from a pH of 10 to a pH of about 11. Its superiority over such known sequestrants as sodium bis(hydroxyethyl) glycinate and trisodium hydroxyethyl ethylenediamine triacetate can be shown by the following test procedures:

(1) A solution of 0.5 gram of the material to be tested (cf. Table II, infra) is dissolved in 1000 milliliters of pure water and adjusted to the desired pH with an 0.1 normal NaOH or HCl solution.

(2) With agitation, 5 milliliters of standard iron solution (86.1 grams of $FeNH_4(SO_4)_2 \cdot 12H_2O$ per liter) is added to the solution (1) while maintaining the pre-selected pH with additional 0.1 normal NaOH solution. A small sample of the resulting product (about 15 milliliters) is then placed in a stoppered bottle and stored for 2 weeks. If no orange precipitate forms during this time, this is an indication that the ferric iron content in the product is chelated.

(3) To the remaining solution (1) is added another 5-milliliter portion of the standard iron solution and the procedure in (2) repeated.

(4) After five 15-milliliter samples are thus produced, a fresh solution of the material to be tested is prepared as in (1), only an amount of iron equivalent to the total amount of iron added in the five-step process in introduced into the fresh solution. Subsequently, 5 milliliters of standard iron solution is added as in (2) to the thus-prepared fresh solution. A 15-milliliter sample is collected and the process repeated according to (2) and (3) above until a permanent precipitate remains.

(5) All the samples are observed after two weeks. The ferric iron value is equal to or computed from the sample containing the largest amount of iron without precipitation. This value in milligrams per gram of sequestrant is calculated from the formula, $$\frac{\text{milliliter iron solution} \times 10}{\text{weight of sample in grams}} = \text{Fe}^{+3} \text{ value in milligrams}$$

and the results are given in the following table:

TABLE II

|  | Ferric Iron Value | | Molar Ratio in solution, $Fe^{+3}$:Sequestrant |
|---|---|---|---|
|  | Initial | Aged 2 Wks. | |
| Bis(1-methyl-1-carboxy-1-hydroxymethyl) phsophinic acid: | | | |
| pH 7-10 | 1,225 | 1,225 | 6:1 |
| pH 11 | 1,000 | 1,000 | 4.5:1 |
| Na bis (hydroxyethyl) glycinate: | | | |
| pH 7-8 | 270 | 270 | 1.55:1 |
| pH 9 | 85 | 85 | 1:1 |
| pH 10 | 0 | 0 | |
| Na₃ hydroxyethyl ethylenediamine acetate: | | | |
| pH 7-10 | 160 | 160 | 1.5:1 |
| pH 11 | 160 | 0 | |

The iron chelates formed by the phosphinic acid compounds of the instant invention are stable against aging, boiling and drying under alkaline conditions. Even in the presence of strong competing ions, such as chromium, aluminum, calcium and/or magnesium ions, more than one mole of ferric iron is sequestered for each mole of sequestrant.

The sequestrants of the present discovery also have the ability to redissolve precipitated ferric hydroxide. For example, a ferric salt, such as $FeCl_3$, may be reacted with $NH_4OH$ in approximately stochiometric amounts, and the resulting precipitated $Fe(OH)_3$ filtered and washed. The $Fe(OH)_3$ solids thus produced, when admixed with an aqueous solution of, say, bis(1-methyl-1-carboxy-1-hydroxymethyl)phosphinic acid are redissolved and complexed with the sequestering agent.

EXAMPLE 10

The stability of the ferric chelate of bis(1-methyl-1-carboxy-1-hydroxymethyl)phosphinic acid, for example, in the presence of water-soluble soaps is shown by the following test:

To two separate solutions, each of which contains 0.1 gram of sodium stearate and 0.1 gram of trisodium bis(1-methyl-1-carboxy - 1 - hydroxymethyl)phosphinate (prepared as in Example 5, above) in 99.8 milliliters of water, is added enough standard ferric ammonium sulfate solution (see Example 9, above) to provide two separate samples having, respectively, 1:1 and 2:1 molar proportions of iron to the phosphinic acid. The samples are prepared while maintaining the pH of the mixtures at 10. The resulting solutions are stable against aging, chilling and boiling. On the other hand, however, an 0.1 per cent by weight sodium stearate solution containing no sequestrant gives a precipitate immediately upon addition of even small amounts of the iron solution.

This application is a division of U.S. Serial No. 668,332, filed June 27, 1957, now U.S. Patent 2,953,584, issued September 20, 1960.

We claim:

A method of solubilizing iron in an aqueous iron-containing solution having a pH not lower than 7 which comprises incorporating therein a sequestering amount of a phosphinic acid derivative selected from the group consisting of bis-(1-alkyl-1-carboxy-1-hydroxymethyl)phosphinic acids and the alkali metal and alkaline earth metal salts thereof.

References Cited in the file of this patent

UNITED STATES PATENTS

| 2,174,019 | Sullivan | Sept. 26, 1939 |
| 2,594,454 | Kosolapoff | Apr. 29, 1952 |
| 2,845,454 | Buckler et al. | July 29, 1958 |
| 2,953,584 | Buckler et al. | Sept. 20, 1960 |

UNITED STATES PATENT OFFICE
CERTIFICATE OF CORRECTION

Patent No. 3,060,127                      October 23, 1962

Sheldon A. Buckler et al.

It is hereby certified that error appears in the above numbered patent requiring correction and that the said Letters Patent should read as corrected below.

Column 1, lines 20 to 24, the formula should appear as shown below instead of as in the patent:

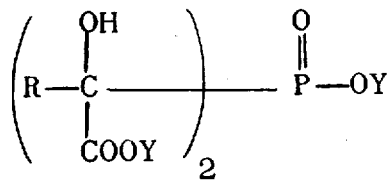

Signed and sealed this 23rd day of April 1963.

(SEAL)
Attest:

ERNEST W. SWIDER
Attesting Officer

DAVID L. LADD
Commissioner of Patents